United States Patent [19]
Wasserlein, Jr.

[11] 3,964,133
[45] June 22, 1976

[54] BUNDLE TIE DEVICE

[75] Inventor: Henry George Wasserlein, Jr., Seminole, Fla.

[73] Assignee: AMP Incorporated, Harrisburg, Pa.

[22] Filed: Sept. 21, 1973

[21] Appl. No.: 399,644

[52] U.S. Cl. .............................. 24/23 R; 24/16 PB; 24/20 R
[51] Int. Cl.² ........................................ B65D 63/06
[58] Field of Search ............ 24/16 PB, 16 R, 17 R, 24/17 A, 17 AP, 20 R, 20 EE, 20 TT, 22, 23 EE, 23 R, 73 PB, 206 A

[56] References Cited
UNITED STATES PATENTS

| 184,397 | 11/1876 | Macumber | 24/20 EE |
|---|---|---|---|
| 3,078,532 | 2/1963 | Bywater | 24/22 |
| 3,694,863 | 10/1972 | Wasserlein, Jr. | 24/16 PB |

FOREIGN PATENTS OR APPLICATIONS

| 1,533,232 | 2/1967 | France | 24/73 PB |
|---|---|---|---|
| 731,350 | 2/1943 | Germany | 24/17 R |

Primary Examiner—Bernard A. Gelak
Attorney, Agent, or Firm—Robert W. Pitts; Frederick W. Raring; Jay L. Seitchik

[57] ABSTRACT

Bundle tie devices, which may be of metal, comprises a thin strip of material having transversely extending slots. The slots have enlarged ends and the material between the enlarged ends is formed outwardly to provide vanes which are interleaved when the device is applied to a bundle. The side of the strip which is against the bundle has no projections which might damage the insulation of the wires in the bundle.

2 Claims, 8 Drawing Figures

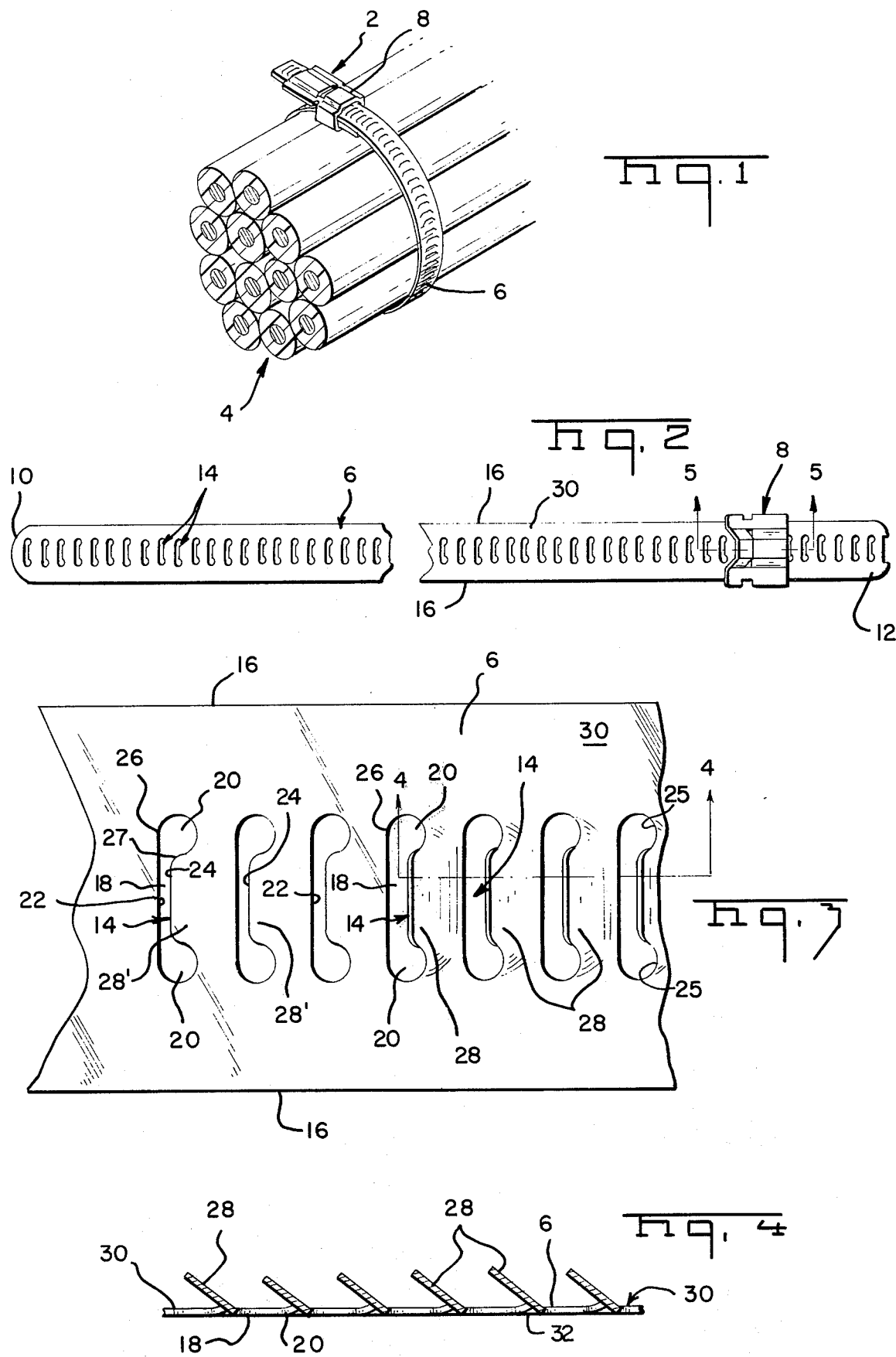

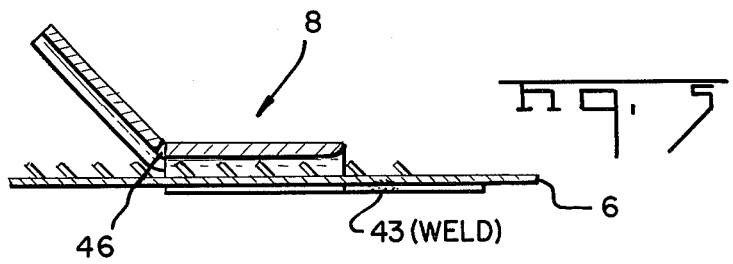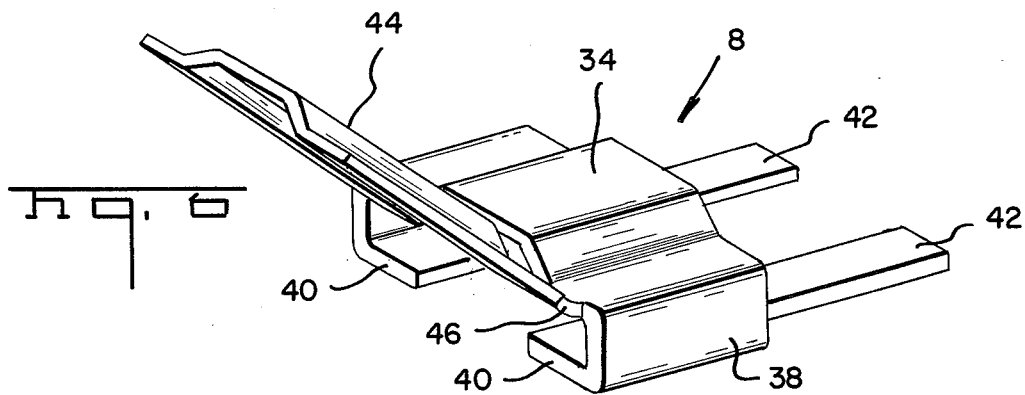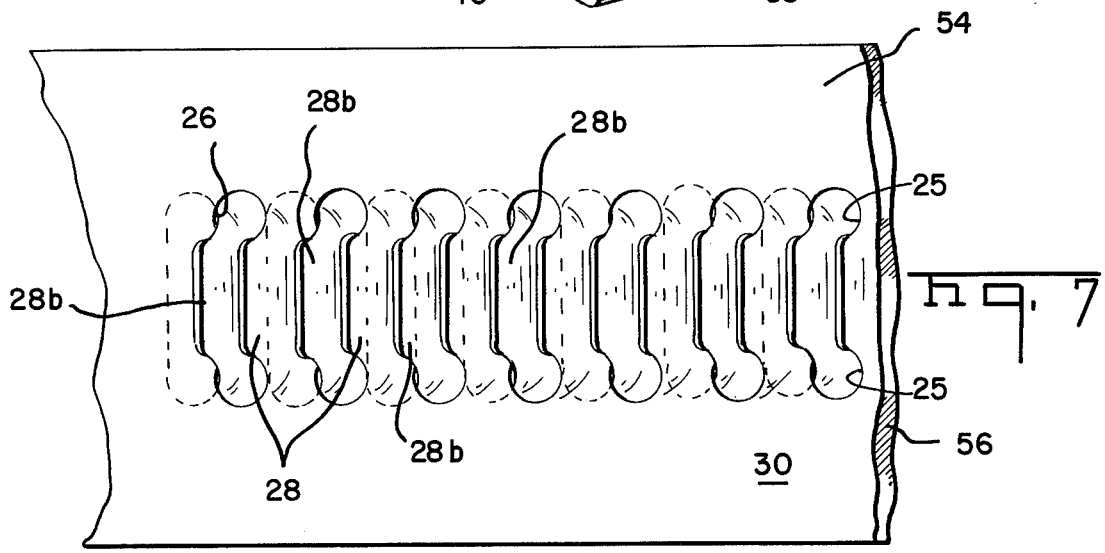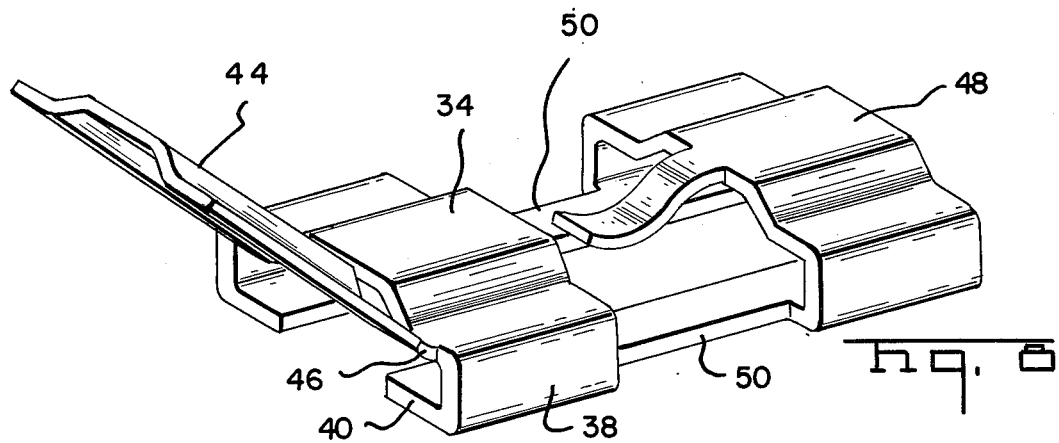

BUNDLE TIE DEVICE

BACKGROUND

This invention relates to an improved bundle tie device for bundling wires in an electrical harness or for similar purposes. Bundle ties in accordance with the invention can be formed of thin sheet metal, which is preferable to plastic under some circumstances such as high temperature conditions and where the tie will be subject to nuclear radiation effects.

A wide variety of bundle tie devices have been proposed in previously issued U.S. patents and there are many different types of ties currently being used. Most, if not all, of the known bundle tie devices are of a plastic material and their design is such that they cannot be manufactured from material other than plastic. In my previous U.S. Pat. No. 3,694,863, I disclose and claim a bundle tie device which can be of either a plastic or metallic material and ties of this type have been manufactured of plastic and metal. The bundle tie device shown in this previous patent has a plurality of interlocking vanes which extend beyond both surfaces of the tie, a feature which is not objectionable if the tie is formed of a plastic strip. However, where the tie is of metal strip, the vanes which project beyond the inner surface (which is against the wire bundle) are objectionable in that there is a possibility that they may penetrate and damage the insulation of the wires.

The instant invention is specifically directed to a tie having the interlocking vane feature of U.S. Pat. No. 3,694,863 but which has one surface which is devoid of projecting vanes so that it can be applied to a wire bundle without fear of damage to the insulation of the wires in the bundle.

It is accordingly an object of the invention to provide an improved bundle tie device. A further object is to provide a bundle tie device which can be manufactured from a metallic strip material. A further object is to provide a metallic bundle tie which will not have projections on the surface thereof which is against the bundle after the tie has been applied to the bundle. A further object is to provide a metallic bundle tie device which can be manufactured at an extremely low cost by stamping and forming operations.

These and other objects of the invention are achieved in preferred embodiments thereof which are briefly described in the foregoing abstract, which are described in detail below, and which are shown in the accompanying drawing in which:

FIG. 1 is a perspective view of a bundle tie device in accordance with the invention as applied to a wire bundle.

FIG. 2 is a plan view of a bundle tie device in accordance with the invention.

FIG. 3 is a plan view on a greatly enlarged scale of a portion of the tie illustrating the manner of forming the vanes in the tie which interlock when the tie is applied to a bundle.

FIGS. 4 and 5 are views taken along the lines 4—4 and 5—5 of FIGS. 3 and 2 respectively.

FIG. 6 is a perspective view of the keeper of the bundle tie of FIG. 1.

FIG. 7 is a plan view of the overlapping portions of a tie as applied to a wire bundle.

FIG. 8 shows an alternative type of keeper for preventing disengagement of the overlapping portions of the tie.

As shown in FIG. 1, bundle ties 2 in accordance with the invention are applied to groups of wires in an electrical harness or under other circumstances to hold the wires in a neat and compact bundle 4. It is a general requirement of bundle ties that they be capable of being readily applied and resistant to relaxation after they are applied to the bundle. Conventional plastic ties are satisfactory under most circumstances but they are inclined to relax or otherwise deteriorate under some circumstances. Ties in accordance with the invention, if formed of metal strip, are immune to such relaxation under extreme conditions of temperature or other adverse effects which would cause deterioration of a plastic bundle tie.

The bundle tie 2 comprises an elongated strip 6 having a leading end 10, a trailing end 12, and a keeper 8 mounted thereon adjacent to the trailing end. A plurality of slots 14 are provided in the tie and extend between the side edges 16 thereof. Vanes 28 are formed adjacent to these slots and are interlocked when the tie is applied to a bundle in a manner described below. The structural characteristics of these vanes are best understood from a description of the manner in which they are formed as shown in FIG. 3.

The transversely extending slots 14 are punched out of the metal strip in a conventional stamping operation and have relatively narrow central portions 18 and enlarged end portions 20 which are adjacent to the side edges 16 of the strip. The narrow central portion 18 of each slot is defined by a leading edge 22 which is proximate to the leading end 10 of the strip and a trailing edge 24 which is proximate to the trailing end 12 of the strip. The enlarged ends 20 of each slot are generally circular as shown and the leading edge 22 of each slot is tangent to both of the associated enlarged end portions 20 as shown at 26. The diameter of these circular enlarged end portions is greater than the distance between a leading end trailing edges 22, 24 so that these enlarged end portions extend rearwardly in the strip beyond the trailing edges 24 to a point 25 between the trailing edge of the particular slot in question and the leading edge of the immediately adjacent slot. It will be noted that the trailing edges intersect the circular enlarged end portions 20 but the intersection is preferably rounded or curved as shown at 27 in order to avoid the presence of sharp points in the finished bundle tie device.

The vanes 28, are formed from the material 28' of the strip which is bounded by the trailing edges 24 of the slots and the adjacent edges of the enlarged end portions 20 of the slots. These vanes are formed upwardly from the plane of the strip as shown in FIG. 4 at an angle of about 35 degrees. As also shown in FIG. 4, the underside 32 of the strip 6 does not have any projections extending therefrom which might cause damage to a wire bundle.

The keeper 8 comprises a buckle-like device having a central portion 34 which extends across, and is spaced from, the upper surface 30 of the strip and side portions 38 which extend past the side edges 16 of the strip. Flanges 40 extend from these side portions inwardly towards each other on the underside 32 and ears, integral with these side portions, are spot welded as shown at 43 to the underside of the strip to restrain the keeper against movement.

A shield 44 is provided on the central portion 34 of the keeper and is connected thereto by two relatively narrow connecting sections 46 which are adjacent to the edges of the strip. This shield is on the side of keeper which is proximate to the leading end 10 of the strip so that it can be bent against the strip to cover the cut end of the strip after application, as described below.

Bundle ties in accordance with the invention can be formed of a thin plastic strip such as Mylar (polyethylene-terephalate) if desired and can be made from relatively thin strip metal if the requirements of the intended used so dictate. In fact, a high performance embodiment of the invention has been manufactured using AISI type 302 stainless steel (C—0.15 max., Cr — 17.0 - 19.0, Ni—8.0 – 10.0, Mn—2.0 max.) strip having a thickness of 0.006 inch and in No. 4 hard temper. The vanes 28 can be formed notwithstanding the physical properties of this material and the finished ties are suitable for use under extreme conditions.

In use, the bundle tie device is wrapped around the bundle of wires with the surface 32 against the bundle and the leading end 10 is threaded through the keeper 8. The bundle tie device is then drawn up until it tightly embraces the body and the portion of the leading end which extends beyond the shield 44 is cut. The shield is then bent downwardly so that it covers the cut leading edge of the strip as shown in FIG. 1.

The vanes of the inner and outer overlapping layers interlock and the keeper 8 is not really essential in that it does not carry any of the tensile forces imposed on the strip after application of the tie to the bundle. As shown in FIG. 7, the outer layer 54 of the overlapping portion has the leading edges 22 of the slots therein proximate to the cut end of the strip and the vanes 28b of the inner overlapping layer 56 (the layer which is against the bundle) extend through the central portions 18 of the slots of the outer overlapping layer. The tensile forces imposed on the strip by the compressed bundle cause the inner ends of the slots of the inner overlapping layer 56 to bear against the leading edges of the slots in the outer overlapping layer 54 at 26 so that the two layers are locked to each other. The tensile forces in the strip are transmitted by the leading edges 22 of the slots in outer layer 54 and the inner ends of the enlarged portions 20 of the slots in inner layer 56 as illustrated in FIG. 7. The keeper is desirable, notwithstanding the fact that it does not transmit stresses, in that it prevents accidental peeling of the outer layer from the inner layer (pulling of the outer layer radially away from the bundle).

FIG. 8 shows an alternative form of keeper having an auxiliary buckle 48 which is connected to the keeper 8 by means of spaced apart connecting links or strap sections 50 on the underside of the device. A cantilever spring finger 52 extends from the auxiliary buckle 48 towards the other buckle to guide the leading end of the strip into the other buckle. This alternative buckle may be particularly useful when a bundle tie in accordance with the invention is applied to a relatively small bundle of wires so that the radius of the tie after it has been applied is somewhat smaller than would be desired. The auxiliary buckle device ensures that an adequate number of vanes will be interlocked in the overlapping portions of the strip.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. A stamped and formed metal bundle tie device, said device being in situ on a bundle, said device comprising:
   an elongated relatively narrow and relatively thin strip of sheet metal, said strip having a leading end and a trailing end,
   a plurality of punched out slots in said strip, said slots extending transversely across said strip at equally spaced intervals, each of said slots having a central portion of reduced and uniform width and having enlarged ends proximate the sides of said strip, said central portion of each slot having two spaced apart transversely extending parallel edges, one of said edges being a leading edge and being proximate to said leading end of said strip and the other one of said edges being a trailing edge and being proximate to the trailing end of said strip,
   said enlarged ends of each slot being circular, said ends extending from said leading edge rearwardly towards and past said trailing edge to a point between said trailing edge and the leading edge of the adjacent slot, said leading edge of each slot merging tangentially with said enlarged ends of each slot,
   the sections of said strip between said enlarged ends of each slot being formed outwardly in one direction from the plane of said strip to provide a plurality of spaced apart vanes, all of said vanes extending from said strip on only one side of said strip, said vanes being substantially parallel, each of said vanes having an outer edge formed by the trailing edge of the associated slot and each of said vanes sloping toward said strip,
   said leading end of said strip over-lapping said trailing end of said strip with said vanes proximate to said trailing end of said strip extending through said central portions of said slots proximate to said leading end, and said tangential leading edge of said slots proximate to said leading end bearing against said enlarged end portions of said slots proximate to said trailing end, at a location in said last mentioned slots between said trailing edge and said leading edge of the adjacent slot whereby, said vanes and said slots are interlocked to form a bundle tie in which the vanes do not project inwardly where they might damage the conductors.

2. A bundle tie device comprising:
   an elongated relatively narrow and relatively thin strip of material, said strip having a leading end and a trailing end,
   a plurality of punched out slots in said strip, said slots extending transversely across said strip at equally spaced intervals, each of said slots comprising a central portion and enlarged end portions, said central portion having two parallel edges, one of said edges constituting a leading edge and one of said edges constituting a trailing edge,
   said enlarged end portions of each slot being on each side of said central portion, said enlarged portions merging tangentially with said leading edge and extending in the direction of the length of said strip past said trailing edge to a point between said trailing edge and the leading edge of the adjacent slot,
   the sections of said strip bounded by said trailing edges of said slots and said enlarged portions of said slots being bent obliquely with respect to the plane of said strip to form vanes extending obliquely in a common direction, all of said vanes extending from said strip on only one side of said strip, said vanes being substantially parallel, said leading end of said strip overlapping said trailing end of said strip with said vanes proximate to said trailing end of said strip extending through said central portions of said slots proximate to said leading end, and said tangential leading edge of said slots proximate to said leading end bearing against said enlarged end portions of said slots proximate to said trailing end at a location in said last mentioned slots between said trailing edge and said leading edge of the adjacent slot whereby, said vanes and said slots are interlocked to form a bundle tie in which the vanes do not project inwardly, and collar means mounted on said strip, said collar means having portions extending transversely over, and spaced from, said strip, said collar means having an integral shield extending therefrom on one side, said shield being deformed towards said strip to cover the end of said strip.

* * * * *